(12) United States Patent
Faika et al.

(10) Patent No.: US 7,690,848 B2
(45) Date of Patent: Apr. 6, 2010

(54) OPTICAL FIBER PLUG CONNECTOR

(75) Inventors: Hans-Joachim Faika, Berlin (DE);
Dietrich Rund, Berlin (DE);
Hans-Peter Sandeck, Berlin (DE)

(73) Assignee: ADC GmbH, Berlin (DE)

( * ) Notice: Subject to any disclaimer, the term of this patent is extended or adjusted under 35 U.S.C. 154(b) by 0 days.

(21) Appl. No.: 12/198,485

(22) Filed: Aug. 26, 2008

(65) Prior Publication Data

US 2008/0317413 A1    Dec. 25, 2008

Related U.S. Application Data

(63) Continuation of application No. 10/591,647, filed as application No. PCT/EP2005/001990 on Feb. 25, 2005, now Pat. No. 7,419,309.

(30) Foreign Application Priority Data

Mar. 17, 2004  (DE) ................ 10 2004 013 905

(51) Int. Cl.
*G02B 6/36* (2006.01)
*G02B 6/38* (2006.01)
*G02B 6/00* (2006.01)

(52) U.S. Cl. ............... 385/59; 385/53; 385/55; 385/56; 385/60; 385/62; 385/63; 385/66; 385/70; 385/71; 385/72; 385/75; 385/76; 385/77; 385/78; 385/88; 385/89; 385/92; 385/136; 385/137; 385/138; 385/139

(58) Field of Classification Search ............ 385/53, 385/55, 56, 59, 60, 62, 63, 66, 70, 71, 72, 385/75, 76, 77, 78, 88, 89, 92, 136, 137, 385/138, 139
See application file for complete search history.

(56) References Cited

U.S. PATENT DOCUMENTS

| | | | |
|---|---|---|---|
| 4,432,602 A | 2/1984 | Margolin |
| 4,614,402 A | 9/1986 | Caron et al. |
| 5,166,995 A | 11/1992 | Briggs et al. |
| 5,329,604 A | 7/1994 | Baldwin et al. |
| 5,363,460 A | 11/1994 | Marazzi et al. |
| 5,717,802 A | 2/1998 | Briggs et al. |
| 5,774,611 A | 6/1998 | Nagase et al. |

(Continued)

FOREIGN PATENT DOCUMENTS

DE    102 19 935 A1    11/2003

(Continued)

*Primary Examiner*—Charlie Peng
*Assistant Examiner*—Hung Lam
(74) *Attorney, Agent, or Firm*—Merchant & Gould P.C.

(57) ABSTRACT

The invention relates to an optical fiber plug connector, comprising at least one pair of plug connectors and a coupling, whereby each plug connector comprises a ferrule, each two ferrules of a pair of plug connectors are detachably guided and aligned together within a guide sleeve and the coupling has a housing, for each of the plug connectors. According to the invention, a compact space-saving optical fiber plug connector made from few components may be achieved, whereby the coupling is made from only one component.

18 Claims, 2 Drawing Sheets

U.S. PATENT DOCUMENTS

| | | |
|---|---|---|
| 5,796,894 A | 8/1998 | Csipkes et al. |
| 6,135,644 A * | 10/2000 | Hakogi et al. .................. 385/92 |
| 6,206,577 B1 | 3/2001 | Hall, III et al. |
| 6,227,719 B1 * | 5/2001 | Aoki et al. .................... 385/59 |
| 6,382,842 B1 * | 5/2002 | Arima et al. .................. 385/77 |
| 6,709,165 B2 | 3/2004 | De Marchi |
| 6,811,321 B1 | 11/2004 | Schmaizigaug et al. |
| 6,932,514 B2 | 8/2005 | Anderson et al. |
| 7,128,470 B2 | 10/2006 | Scherer et al. |
| 2005/0117852 A1 | 6/2005 | Scherer et al. |
| 2005/0135753 A1 | 6/2005 | Eigenmann et al. |
| 2006/0093274 A1 | 5/2006 | Kahle et al. |

FOREIGN PATENT DOCUMENTS

| | | |
|---|---|---|
| DE | 102 28 008 A1 | 1/2004 |
| EP | 0 731 369 A2 | 9/1996 |
| WO | WO 03/076997 A1 | 9/2003 |

* cited by examiner

OPTICAL FIBER PLUG CONNECTOR

This application is a Continuation of U.S. Ser. No. 10/591,647, filed 2 Jun. 2007, now issued as U.S. Pat. No. 7,419,309, which is a National Stage of PCT/E2005/001990, filed 25 Feb. 2005, which claims priority to Ser. No. 10 2004 013 905.9, filed 17 Mar. 2004 in Germany, and which applications are incorporated herein by reference and a claim of priority to all is made.

TECHNICAL FIELD

The present invention relates to an optical fiber plug-in connection comprising at least one pair of plug-in connectors and a coupling.

BACKGROUND

In optical transmission technology, there is often the task of accommodating a number of individual optoelectronic or optical components in a confined space and in such cases connecting their pigtails in such a way that only a small amount of additional space is required for this. An actual example is a printed circuit board with a number of optoelectronic components (for example laser diodes or photodiodes) and also passively optical fiberoptic components (for example couplers, splitters, wavelength multiplexers). A further example is an Ethernet transceiver module, in which a number of laser diode modules and receiving diode modules and also an optical multiplexer/demultiplexer pair are accommodated in a standardized compact module housing. The individual components in all these cases are provided with pigtails, which have to be connected to one another on the printed circuit board or within the module housing with a minimal space requirement. The optical fibers are in this case either only provided with a primary coating (typical diameter 245 μm) or formed as secondary coated fibers (typical diameter 900 μm). In many cases, flexibility is desired for these connections, allowing individual ones to be disconnected and reconnected, for example for measuring purposes.

An optical fiber plug-in connection of the generic type is already known from the reference WO 03/076997 A1. This plug-in connection comprises a two-part coupling and a number of plug-in connectors which can be inserted between the coupling parts. The coupling is in this case made up of an upper part and a lower part, which are aligned with respect to each other during assembly by guiding means (for example guiding pins) and are connected to each other for example by screwing. Once the two coupling parts have been connected to each other, the plug-in connectors can be respectively inserted between the coupling parts through corresponding inlet openings on the opposing longitudinal sides. The coupling parts have for this purpose inner insertion channels corresponding to the number of suitable plug-in connectors. In an insertion channel, two plug-in connectors are guided and aligned coaxially in relation to each other, so that their ferrule end faces abut resiliently within a guiding sleeve. The plug-in connectors have in this case a securing means in the form of a frame, in which the ferrules provided with a flange (diameter 1.25 mm) are spring-mounted. Attached to the rear part of the securing means is a crimping neck, which allows cable strain-relieving elements to be anchored on the plug-in connector by means of crimping. For each plug-in connector there is an opening in the upper part of the coupling. Through this opening, a latching element arranged on the plug-in connector can be unlocked by means of a tool if the plug-in connector is to be pulled out of the insertion channel. In the case of this optical plug-in connection, the plug-in connectors can be individually accessed as desired.

A disadvantage of this optical fiber plug-in connection is that the coupling comprises an upper part and a lower part and a number of fastening parts, which are necessary for connecting and putting together the upper part and lower part. For instance, the upper part and lower part must be aligned exactly with respect to each other and connected to each other by means of a number of screw connections. The production of the parts and their assembly involve considerable effort. Likewise, the plug-in connector is provided with a series of components, which have to be individually created for the plug-in connector system described. For instance, the possibility of crimping strain-relieving elements on the connector parts must be provided.

It is therefore the object of the present invention to provide a compact, space-saving optical fiber plug-in connection which comprises only few components.

The optical fiber plug-in connection according to the invention has in particular the advantage that the coupling comprises only a single component and can consequently be produced and assembled in a simple manner. Putting together the optical fiber plug-in connection no longer involves complex assembly operations. The optical properties of the connections (attenuation, return loss) and also their climatic and mechanical stability (vibration, impact loading) correspond to those of a high-grade optical plug-in connection, as required for the corresponding application in transmission technology.

SUMMARY

Further advantageous refinements of the invention emerge from the subclaims.

For instance, the sleeve receptacles and receptacles for the plug-in connectors are integrated within the coupling and constructed in a simple form in production engineering terms.

The plug-in connectors of a pair are aligned coaxially with respect to each other and detachably fixed within the coupling by means of a latching device, so that access to individual pairs of fibers of those connected is possible according to choice.

According to an embodiment, there is the advantage that each plug-in connector has an arresting part with a T-shaped attachment, which engages in the guiding groove of the coupling. As a result, the plug-in connector is mounted and guided in the coupling and the ferrules are mounted and guided in the guiding sleeve in a very simple way, the two ferrule end faces of a pair of plug-in connectors abutting resiliently on account of the compression springs within the guiding sleeve.

BRIEF DESCRIPTION OF THE DRAWINGS

The invention is explained in more detail below on the basis of an exemplary embodiment represented in the drawings, in which.

DETAILED DESCRIPTION

Figure 1:
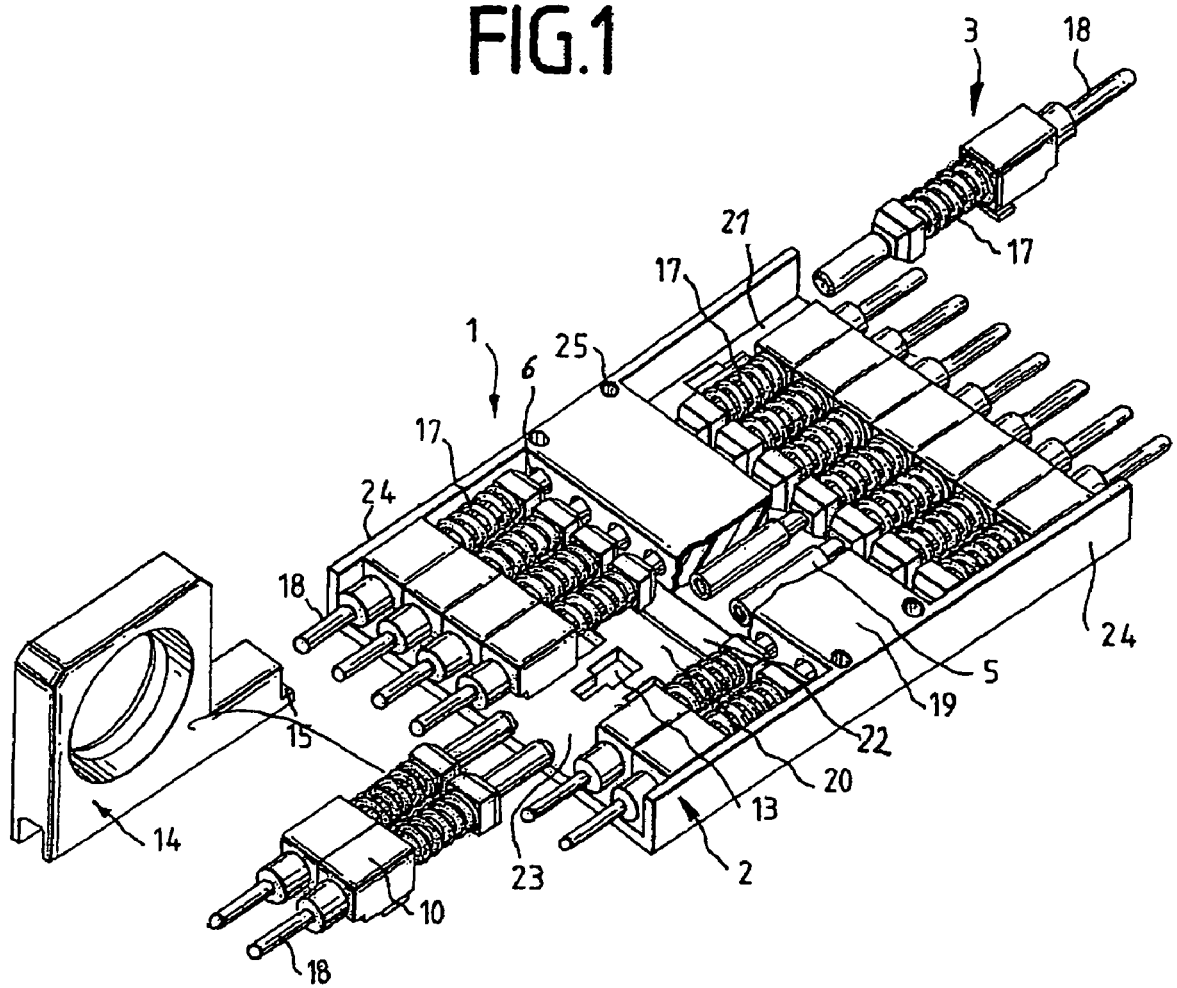
FIG. 1 shows a perspective view of an optical fiber plug-in connection with a coupling and eight pairs of plug-in connectors.

In FIG. 1, an optical fiber plug-in connection 1 is shown as a multiple optical fiber plug-in connection for eight pairs of plug-in connectors 3. The optical fiber plug-in connection 1 comprises a coupling 2 with plug-in connectors 3 arranged therein. The coupling 2 comprises a base plate 23 and two side walls 24, so that two receptacles 20, 21 lying opposite each other are formed for the plug-in connectors 3. Additionally provided, centrally between the receptacles 20, 21 is a sleeve receptacle 19, which in FIG. 1 is represented partly in a broken-open view to illustrate the position and arrangement of the guiding sleeves 5 inserted into the sleeve receptacle 19. The sleeve receptacle 19 additionally has four through-bores 25, so that either a number of couplings 2 can be screwed to one another, lying one on top of the other, or a single coupling 2 can be screwed onto a plate (not represented).

Figure 2:
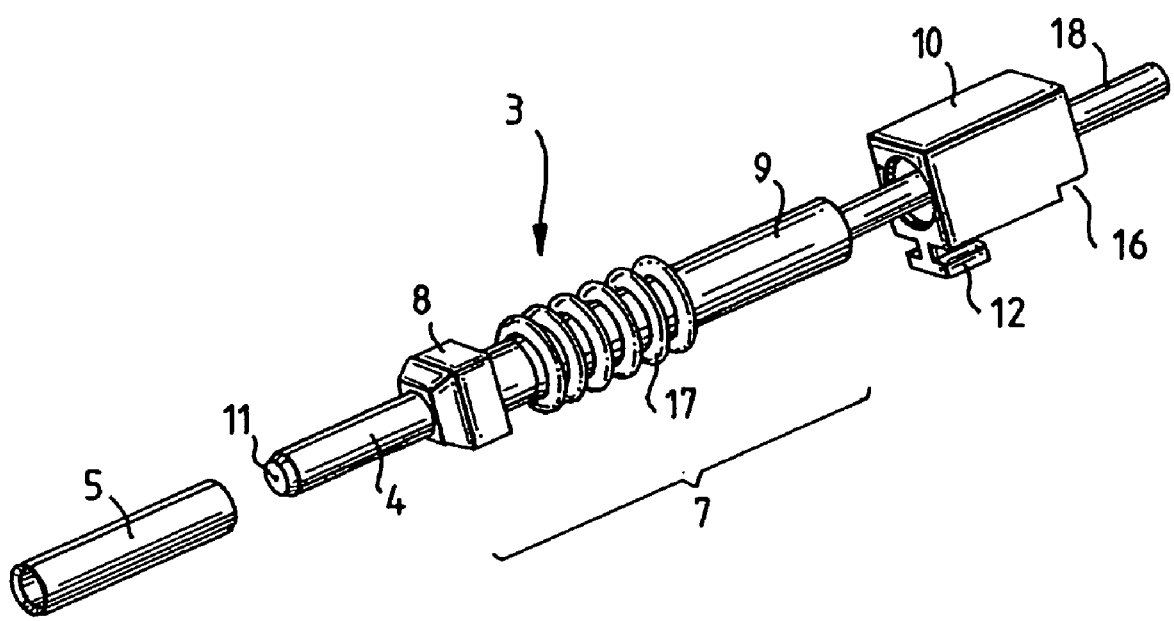
FIG. 2 shows a perspective view of a plug-in connector.

Each plug-in connector 3, which is also shown in FIG. 2, comprises a ferrule 4, a ferrule flange 7 and an arresting part 10. As explained in more detail later, the end of the optical fiber 18 is cemented into the ferrule 4, with primary or secondary coated optical fibers being used in particular.

In the coupling 2, the plug-in connectors 3 are respectively connected to one another in pairs. Each plug-in connector 3 of a pair is in this case positioned into the separate first and second receptacles 20, 21. The coupling 2, acting together with the plug-in connectors 3, has the task of aligning the ferrules 4 of a pair of plug-in connectors 3 with respect to each other and pressing them together with the required compression force. For the necessary compression force—as shown in FIG. 2—the plug-in connector 3 is provided with a compression spring 17, which is pushed onto the ferrule extension 9. (The permissible tolerance range for the compression force in the case of all standardized optical plug-in connectors with cylindrical zirconium ferrules is fixed and is instrumental in reliably maintaining the optical data of the plug-in connection). Serving for the alignment of the ferrules 4 are the guiding sleeves 5, which are customary in the case of optical fiber plug-in connectors with a cylindrical ferrule.

The guiding sleeves 5 are accommodated in the central region of the coupling 2, in the sleeve receptacle 19. For this purpose, the sleeve receptacle 19 is provided with a series of equidistant bores 6, in which the guiding sleeves 5 are accommodated in a protected manner in the inserted state of the plug-in connectors 3 (with lateral play in relation to the walls of the bores).

FIG. 2 shows an optical fiber 18 prepared for use with the optical fiber plug-in connection and fabricated with a plug-in connector 3. The end of the optical fiber 18 freed of the coating is cemented in the ferrule 4 provided with a ferrule flange 7, in a way corresponding to the customary technique used when fabricating optical fiber connectors. The ferrule flange 7 is formed in the front region as a square 8 and in the rear part as a cylindrical ferrule extension 9, which serves as a guide for the compression spring 17 and receives in its interior the adhesive that is used to ensure adequate strain relief of the optical fiber 18 provided with a primary or secondary coating. The flanged ferrule (diameter 1.25 mm) is the same design as that used in the case of an optical fiber connector of the LC type. However, in principle a different 1.25 mm ferrule provided with a flange, of the SFF (Small Form Factor) connector type or some other type (for example MU or LX.5), may also be used. The ferrule end face 11 is provided during fabrication with a suitable polish (for example PC or UPC), as also applied in the fabrication of a customary connector. Furthermore, during fabrication, the compression spring 17 and the arresting part 10 are pushed onto the optical fiber 18 before the end of the optical fiber 18 is cemented into the ferrule 4.

To establish a connection between two plug-in connectors 3, firstly a guiding sleeve 5 is pushed onto one of the ferrules 4 of a pair of plug-in connectors 3. The ferrule 4 with the guiding sleeve 5 is then introduced into a free bore 6 of the sleeve receptacle 19 of the coupling 2, with the plug-in connector being placed into the first receptacle 20. After compressing the compression spring 17 by a defined amount, the T-shaped attachment 12 formed at the bottom of the arresting part 10 can be introduced into the correspondingly shaped guiding groove 13 in the coupling 1 and arrested there by pushing it back in the axial direction. The compression spring 17 respectively strikes against the square 8 and the arresting part 10. Once the plug-in connector 3 of the other side has been placed into the second receptacle 21 and the flanged ferrule 4 of the other side introduced into the bore 6 and arrested in the same way, the two compression springs 17 provide the correct compression force between the two ferrules 4 of a pair of plug-in connectors 3. The two ferrule end faces 11 then abut resiliently under pressure.

To disconnect a connection between two plug-in connectors 3, the tool 14 represented in FIG. 1 is used, with which the arresting part 10 is released from the guiding groove 13 by pressure in the axial direction against the spring tension. For this purpose, the tool 14 is provided in the front region with two lugs 15, which engage in corresponding clearances 16 in the arresting parts 10.

Apart from the ferrules 4 with PC or UPC polish, the optical fiber plug-in connection may also be used for the connection of obliquely polished APC ferrules. For this purpose, a step 22 is formed on both sides of the sleeve receptacle 19. This step 22 provides the required twist prevention of the ferrules 4, since the square 8 of the ferrule flange 7 rests on this step 22 in the inserted state of the plug-in connector 3, and the plug-in connector 3 consequently cannot twist.

For a connection to be established more efficiently, it is also conceivable to combine a group (for example four) of plug-in connectors 3 that are adjacent in the optical fiber plug-in connection 1 by means of the arresting parts 10 to form a single part and in this way collectively establish the connection for the group of plug-in connectors concerned in a single operation.

Furthermore, it is possible in principle to dispense with the compression springs 17 on one side of the optical fiber plug-in connection 1, since the required compression force between the ferrules 4 can also be ensured with in each case only one compression spring 17 per connected pair of plug-in connectors. The flanged ferrules 4 are then arrested on one side of the optical fiber plug-in connection 1 by suitable means without springing, in such a way that they cannot move back in the axial direction when the ferrule 4 is introduced on the other side. For this purpose, arresting parts 10 similar to those on the sprung other side can be used.

In principle, the construction of the optical fiber plug-in connection 1 is possible in its smallest configuration in such a way that, by contrast with the exemplary embodiment represented, only a single pair of plug-in connectors 3 is inserted into the coupling 2. Any desired multiples of pairs of plug-in connectors 3 are conceivable, with the coupling 2 being formed in a way corresponding to the number of pairs of plug-in connectors 3.

LIST OF DESIGNATIONS

1 optical fiber plug-in connection
2 coupling
3 plug-in connector
4 ferrule
5 guiding sleeve
6 bore
7 ferrule flange 8 square
9 ferrule extension
10 arresting part
11 ferrule end face
12 T-shaped attachment
13 guiding groove
14 tool
15 lugs
16 clearances
17 compression spring
18 optical fiber
19 sleeve receptacle
20, 21 receptacle for plug-in connector
22 step
23 base plate
24 side walls
25 through-bores

The invention claimed is:

1. An optical fiber plug-in connection, comprising:
first and second plug-in connectors, each plug-in connector having a ferrule configured to hold an optical fiber, a compression spring, and a latch arrangement configured to move axially with respect to the ferrule;
a guide sleeve configured to receive the two ferrules of the first and second plug-in connectors, each of the plug-in connectors respectively being detachably guided and aligned with respect to each other within the guiding sleeve; and
a coupling including a base plate, two side walls, and an open top defining an interior, the coupling defining a first receptacle within the interior that is configured to receive at least the first plug-in connector and a second receptacle within the interior that is configured to receive at least the second plug-in connector, the base plate defining at least one T-shaped guiding groove in each receptacle, each of the guiding grooves extending from a first groove end to a second groove end, the first groove end of each guiding groove being sufficiently wide to facilitate through passage of the latch arrangement of one of the plug-in connectors through the first groove end and the second groove end being sufficiently narrow to inhibit through passage of the latch arrangement through the second groove end, wherein the latch arrangement of each plug-in connector is configured to be passed through the first groove end of one of the guiding grooves and to be biased away from the first groove end toward the second groove end by the respective compression spring when the first and second plug-in connectors are mounted to the coupling.

2. The optical fiber plug-in connection as claimed in claim 1, wherein a plurality of plug-in connectors are arranged next to one another in the coupling.

3. The optical fiber plug-in connection as claimed in claim 1, wherein the coupling is produced from plastic.

4. The optical fiber plug-in connection as claimed in claim 1, wherein each plug-in connector also comprises a ferrule flange, which has a square, and a ferrule extension, which guides the respective compression spring.

5. The optical fiber plug-in connection as claimed in claim 1, wherein a sleeve receptacle is mounted to the base plate and extends between the two side walls, the sleeve receptacle defining a bore to receive the guide sleeve.

6. The optical fiber plug-in connection as claimed in claim 1, further comprising a first plurality of plug-in connectors configured to be inserted into the first receptacle and a second plurality of plug-in connectors configured to be inserted into the second receptacle, wherein the coupling defines a guiding groove for each plug-in connector.

7. The optical fiber plug-in connection as claimed in claim 6, wherein the latch arrangement of each plug-in connector includes an arresting part with a T-shaped attachment, which engages in one of the guiding grooves, wherein the first and second plug-in connectors are respectively guided in a longitudinally displaceable manner in relation to each other and can be fixed in the two receptacles of the coupling.

8. The optical fiber plug-in connection as claimed in claim 1, wherein the plug-in connectors are each provided with a ferrule flange, which has a square, wherein the compression spring of each plug-in connector is pushed over the respective ferrule flange and mounted between the square and the latch arrangement.

9. The optical fiber plug-in connection as claimed in claim 8, wherein the latch arrangements of the plug-in connectors each include an arresting part, and wherein a plurality of plug-in connectors are connected to one another by means of the arresting parts to form a single multiple plug-in connector.

10. The optical fiber plug-in connection as claimed in claim 1, wherein a plurality of couplings are connected to one another, lying one on top of the other, by means of screws inserted into through-bores on the coupling.

11. The optical fiber plug-in connection as claimed in claim 1, wherein each of the first and second plug-in connectors is configured to receive a fiber either with a primary coating with a typical diameter of 245 μm or with a secondary coating with a typical diameter 900 μm.

12. The optical fiber plug-in connection as claimed in claim 1, wherein each of the first and second plug-in connectors is provided with a flanged ferrule of an SFF plug-in connector type with a cylindrical ferrule of a diameter of 1.25 mm.

13. The optical fiber plug-in connection as claimed in claim 1, wherein end faces of the ferrules of the first and second plug-in connectors are preferably provided with one polish selected from the group consisting of a PC polish, a UPC polish, and an APC polish.

14. The optical fiber plug-in connection as claimed in claim 1, wherein the optical fibers of the first and second plug-in connectors are single-mode fibers, multi-mode optical fibers, or optical fibers of the HCS (Hard Clad Silica) type.

15. An optical fiber plug-in connection, comprising:
a coupling including a base plate and a guiding sleeve mounted to the base plate, the base plate defining at least a first guiding groove, the first guiding groove extending from a first groove end to a second groove end, the first groove end being wider than the second groove end to form a T-shape, the guiding sleeve extending from a first sleeve end to a second sleeve end;
a first plug-in connector having a first ferrule, a first compression spring, and a first latch arrangement that is configured to move axially with respect to the ferrule, the first ferrule being configured to be received within the first sleeve end of the guiding sleeve, the first latch arrangement being configured to be passed through the first groove end of the first guiding groove and to be biased away from the first groove end of the first guiding groove toward the second groove end of the first guiding groove by the first compression spring when the first plug-in connector is mounted to the coupling; and
a second plug-in connector having a second ferrule that is configured to be received in the second sleeve end of the guiding sleeve.

16. The optical fiber plug-in connection as claimed in claim 15, wherein the base plate defines a second guiding groove, the second guiding groove extending from a first groove end to a second groove end, the first groove end of the second guiding groove being wider than the second groove end of the second guiding groove; and wherein the second plug-in connector includes a second compression spring and a second latch arrangement, the second latch arrangement being configured to be passed through the first groove end of the second guiding groove and to be biased away from the first groove end of the second guiding groove by the second compression spring when the second plug-in connector is mounted to the coupling.

17. The optical fiber plug-in connection as claimed in claim 16, wherein the second latch arrangement is T-shaped.

18. The optical fiber plug-in connection as claimed in claim 15, wherein the first latch arrangement is T-shaped.

* * * * *